(12) United States Patent
Iritsuki et al.

(10) Patent No.: US 10,483,579 B2
(45) Date of Patent: Nov. 19, 2019

(54) SOLID OXIDE FUEL CELL

(71) Applicant: NISSAN MOTOR CO., LTD., Yokohama-shi, Kanagawa (JP)

(72) Inventors: Keita Iritsuki, Kanagawa (JP); Takao Izumi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/580,418

(22) PCT Filed: Jun. 9, 2015

(86) PCT No.: PCT/JP2015/066611
§ 371 (c)(1),
(2) Date: Dec. 7, 2017

(87) PCT Pub. No.: WO2016/199223
PCT Pub. Date: Dec. 15, 2016

(65) Prior Publication Data
US 2018/0175424 A1  Jun. 21, 2018

(51) Int. Cl.
*H01M 8/1226* (2016.01)
*H01M 8/2432* (2016.01)
*H01M 8/0232* (2016.01)
*H01M 8/124* (2016.01)

(52) U.S. Cl.
CPC ....... *H01M 8/1226* (2013.01); *H01M 8/0232* (2013.01); *H01M 8/2432* (2016.02); *H01M 2008/1293* (2013.01); *H01M 2300/0071* (2013.01)

(58) Field of Classification Search
CPC ............ H01M 8/1226; H01M 8/2432; H01M 8/0232; H01M 2300/0071; H01M 2008/1293

See application file for complete search history.

(56) References Cited

U.S. PATENT DOCUMENTS

| | | | |
|---|---|---|---|
| 8,518,598 B1 * | 8/2013 | Yamanis | H01M 8/0662 429/408 |
| 2005/0221153 A1 | 10/2005 | Sugimoto et al. | |
| 2005/0249996 A1 * | 11/2005 | Meacham | H01M 8/0247 429/432 |
| 2006/0251947 A1 | 11/2006 | Carter et al. | |
| 2006/0286431 A1 | 12/2006 | Chyou et al. | |
| 2009/0092885 A1 | 4/2009 | Erikstrup et al. | |

(Continued)

FOREIGN PATENT DOCUMENTS

| | | |
|---|---|---|
| JP | 10-199555 | 7/1998 |
| JP | 2005-166422 A | 6/2005 |

(Continued)

*Primary Examiner* — Stephen J Yanchuk
(74) *Attorney, Agent, or Firm* — Foley & Lardner LLP

(57) ABSTRACT

A solid oxide fuel cell includes a metal support which is formed from a porous metal substrate and which supports a power generation cell. The metal support includes a power generating area (GA) in which the power generation cell is disposed, and a buffer area (BA) which is formed on an outer side of the power generating area (GA) in an in-plane direction. A pore in the metal support in the buffer area (BA) is filled with a material with a thermal conductivity lower than that of a formation material of the metal support.

16 Claims, 4 Drawing Sheets

(56) References Cited

U.S. PATENT DOCUMENTS

| | | | |
|---|---|---|---|
| 2010/0015491 A1 | 1/2010 | Yamanis | |
| 2010/0086824 A1* | 4/2010 | Homel | H01M 4/8626 |
| | | | 429/406 |
| 2010/0173217 A1 | 7/2010 | Brandner et al. | |
| 2012/0205042 A1 | 8/2012 | Erikstrup et al. | |
| 2014/0120450 A1* | 5/2014 | Gil | H01M 8/243 |
| | | | 429/469 |
| 2014/0234749 A1 | 8/2014 | Tanaka et al. | |
| 2015/0125780 A1* | 5/2015 | Kim | C03C 3/064 |
| | | | 429/479 |

FOREIGN PATENT DOCUMENTS

| | | |
|---|---|---|
| JP | 2009-505370 A | 2/2009 |
| JP | 2010-534901 A | 11/2010 |
| WO | WO 2013/042542 A1 | 3/2013 |

* cited by examiner

SOLID OXIDE FUEL CELL

TECHNICAL FIELD

The present invention relates to a solid oxide fuel cell.

BACKGROUND ART

A fuel cell is a device which converts chemical energy to electrical energy through an electrochemical reaction (see, for example, Patent Literature 1). A solid oxide fuel cell, which is a class of such fuel cell, includes layers of a fuel electrode, an electrolyte, and an air electrode stacked together to serve as a power generation unit of the fuel cell, and is configured to supply the fuel electrode with a fuel gas such as hydrogen or hydrocarbon from the outside and to supply the air electrode with an oxidant gas such as air, thereby generating electricity.

In general, a power generation cell being a power generation unit of a fuel cell is sandwiched by a pair of separators from both sides. A fuel flow path or an air flow path is defined between the power generation cell and the corresponding one of the separators. In addition, there is a power generation cell that is supported on a metal support for ensuring strength.

CITATION LIST

Patent Literature

Patent Literature 1: Japanese Patent Application Publication No. Hei. 10-199555

SUMMARY OF INVENTION

Technical Problem

When a high-temperature oxidant gas flows at once into the above-described solid oxide fuel cell especially at rapid startup, a temperature difference can occur between an outer edge portion (portion near a seal frame) of a metal support and a power generating area on an inner side of the outer edge portion. In that case, an excessively large thermal stress is generated in an end portion of a power generation cell with a relatively low temperature. There is possibility that this thermal stress could break the power generation cell.

Given the above circumstances, the present invention aims to provide a solid oxide fuel cell which can suppress generation of an excessively large thermal stress at rapid startup and suppress breakage of the power generation cell.

Solution to Problem

In a solid oxide fuel cell according to the present invention, a metal support includes a buffer area which is formed on an outer side of a power generating area in an in-plane direction. A pore in the metal support in the buffer area is filled with a material with a thermal conductivity lower than that of a formation material of the metal support.

Advantageous Effects of Invention

If a thermal conductivity of a buffer area of a metal support is lower than a thermal conductivity of a power generating area, it is possible to make small a temperature gradient of an end portion of the power generating area of the metal support because at rapid startup heat does not easily conduct from the power generating area to an outer side. This decreases a temperature difference at an end portion of a power generation cell facing the power generating area, reducing a thermal stress to be generated in the end portion of the power generation cell. Thus, it is possible to suppress generation of an excessively large thermal stress at rapid startup and to suppress breakage of the power generation cell.

DESCRIPTION OF EMBODIMENTS

Hereinafter, embodiments of the present invention are described in detail along with the drawings.

First Embodiment

A solid oxide fuel cell according to a first embodiment of the present invention is described based on FIG. 1 to FIG. 4.

Figure 1:
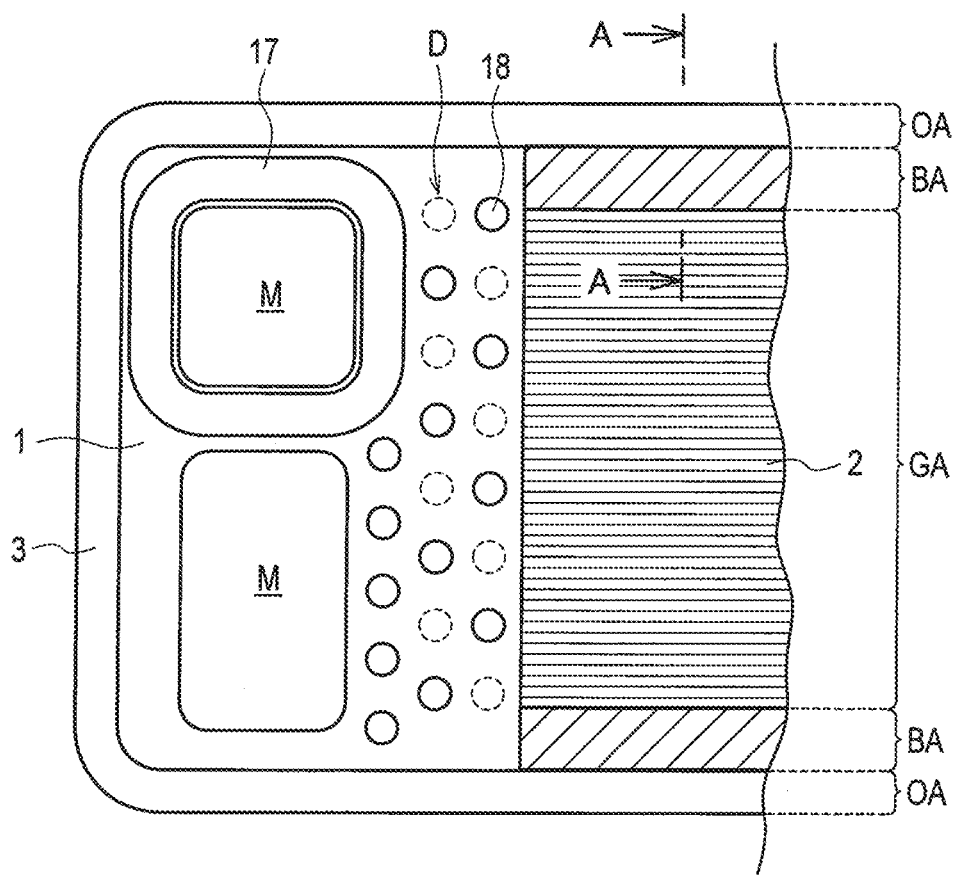
FIG. 1 is a plan view of a fuel cell according to a first embodiment of the present invention.
Figure 2:
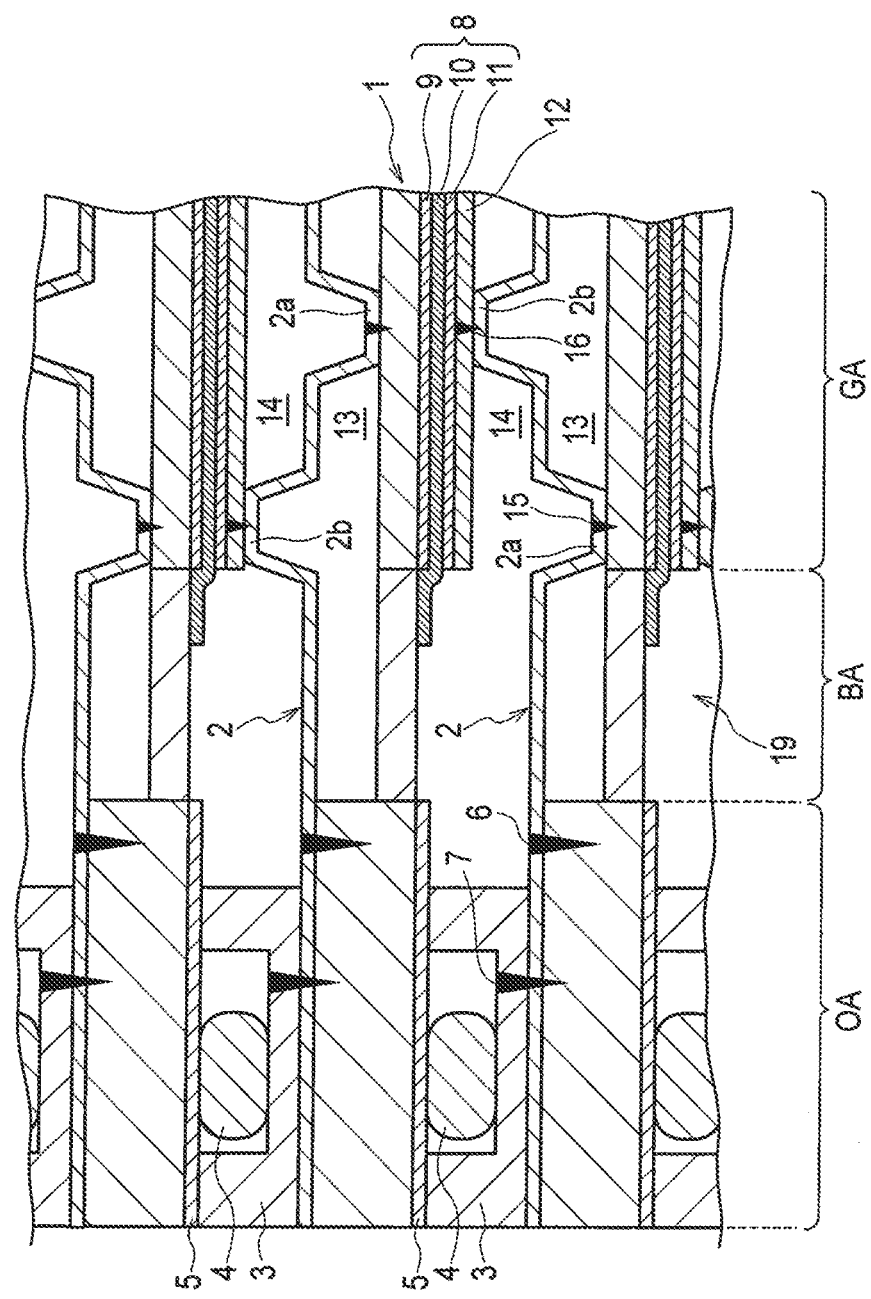
FIG. 2 is a partial cross-sectional view along line A-A of FIG. 1.

The solid oxide fuel cell is a class of a fuel cell which is a device configured to convert chemical energy to electrical energy through an electrochemical reaction. As illustrated in FIG. 1 and FIG. 2, the solid oxide fuel cell according to the embodiment includes a plate-shaped metal support 1, and a pair of separators 2, 2 which sandwich both sides of this metal support 1.

The metal support 1 and the separators 2 stacked together are sandwiched on both sides (both end sides in a stacking direction) by a pair of seal frames 3. These seal frames 3 sandwich and support an outer edge portion (outer peripheral area OA) of the metal support 1. Also, the seal frames 3 sandwich and support outer edge portions of the separators 2. The metal support 1 and the corresponding seal frame 3 are fixed together with an insulation layer 5 made of e.g. an adhesive with a seal material 4 provided in between. On the other hand, the metal support 1 and the corresponding separator 2, and the separator 2 and the seal frame 3 are fixed together by welding. In FIG. 2, a welded portion 6 of the metal support 1 and the separator 2, and a welded portion 7 of the separator 2 and the seal frame 3 are indicated with a triangle.

A power generation cell 8 is disposed on one of the surfaces of the metal support 1. This power generation cell 8 is formed as a stacked body of a fuel electrode (anode electrode) 9, a solid oxide electrolyte 10, and an air electrode (cathode electrode) 11. The fuel electrode 9 and the air electrode 11 are disposed with the electrolyte 10 in between. In the embodiment, the power generation cell 8 is stacked such that the fuel electrode 9 is in contact with the metal support 1. Further, a current collection assist layer 12 is stacked on the air electrode 11 of the power generation cell 8. In such a manner, the metal support 1 supports the power generation cell 8.

Each of the separators 2 is formed such that a portion thereof corresponding to the active area of the power generation cell 8 which contributes to power generation has the shape of a wave and that a contact portion 2a in contact with the metal support 1 and a contact portion 2b in contact with the current collection assist layer 12 are arranged alternately. A fuel gas and an oxidant gas are made to flow in a space defined by the portion of the separator 2 which has the wavy shape and by the metal support 1, and a space defined by the portion of the separator 2 which has the wavy shape and by the current collection assist layer 12, respectively. To be more specific, the separator 2 has a function of defining a fuel flow path 13 or an air flow path 14 between the power generation cell 8 and the corresponding one of the metal support 1 and the current collection assist layer 12. In addition, the separator 2 also has a function of collecting electricity generated by the power generation cell 8.

The separator 2 is fixed to the metal support 1 by welding the contact portion 2a of the separator 2 in contact with the metal support 1, and the separator 2 is fixed to the current collection assist layer 12 by welding the contact portion 2b of the separator 2 in contact with the current collection assist layer 12. In FIG. 2, a welded portion 15 between the separator 2 and the metal support 1, and a welded portion 16 between the separator 2 and the current collection assist layer 12 are indicated with a triangle.

The above-described metal support 1 is formed of a conductive material for the purpose of improving an output of the fuel cell per unit area. Also, gas permeability is required for the metal support 1 in order to supply the electrodes with a fuel gas or an oxidant gas. The metal support 1 is formed from, for example, a porous metal substrate which is made by sintering metal particles. Formed on both sides of the power generation cell 8 on this metal support 1 are: manifold parts M, M for supplying and discharging a fuel gas or an air gas; and diffuser portions D each of which is an area for allowing a fuel gas or an oxidant gas to flow from the manifold parts M, M to the power generation cell 8. In addition, the diffuser portions D are provided with a spacer 17 and protrusions 18.

The metal support 1 includes a power generating area GA in which the power generation cell 8 is disposed, a non-power-generating buffer area BA which is formed in an area on the outer side of the power generating area GA in an in-plane direction and which is not provided with the power generation cell 8, and an outer peripheral area OA which is formed in an area further on the outer side of the buffer area BA. This metal support 1 is configured such that the thicknesses of the power generating area GA and the buffer area BA are smaller than the thickness of the outer peripheral area OA. In other words, the metal support 1 is configured such that the thickness of the outer peripheral area OA is larger than the thicknesses of the power generating area GA and the buffer area BA. In FIG. 1, the areas of the buffer area BA are hatched.

The outer peripheral area OA of the metal support 1 is a portion sandwiched by the seal frames 3 on both sides and is a dense layer which does not allow permeation of gas in a thickness direction. On the other hand, the power generating area GA of the metal support 1 is a porous layer which allows permeation of gas in the thickness direction. The outer peripheral area OA may be densified by pressing or may be densified by sintering metal particles with a relatively large particle diameter.

The buffer area BA of the metal support 1 is originally a porous layer, but unlike the power generating area GA, the pores in the metal support 1 in the buffer area BA are filled with a filler material which has a thermal conductivity lower than that of the formation material of the metal support 1. In such a configuration, the thermal conductivity of the buffer area BA is made lower than the thermal conductivity of the power generating area GA, and the thermal capacity of the buffer area BA is made larger than the thermal capacity of the power generating area GA. In addition, the thermal conductivity of the buffer area BA is made lower than the thermal conductivity of the outer peripheral area OA, and the thermal capacity of the buffer area BA is made larger than the thermal capacity of the outer peripheral area OA by adjusting e.g. the thermal conductivity of the formation material of the metal support 1 and the thermal conductivity of the filler material.

Ceramic materials such as yttria-stabilized zirconia (YSZ), lanthanum strontium magnesium gallate (LSGM), samarium-doped ceria (SDC), gadolinium-doped ceria (GDC), and scandium-stabilized zirconia (SSZ) can be used as the above-described filler material.

The pores in the metal support 1 in the buffer area BA are filled by, for example, impregnating the pores in the metal support 1 with a pasty filler material and then heating and hardening the filler material. Through such a process, in the embodiment, the buffer area BA of the metal support 1 is formed into a dense layer which does not allow permeation of gas in the thickness direction. In addition, an edge seal structure is formed in the electrolyte 10 of the power generation cell 8 by extending an end portion of the electrolyte 10 into the buffer area BA.

Moreover, a flow path space 19 may be formed in a space next to the buffer area BA of the metal support 1. The flow configuration may be such that a gas is allowed to flow in this flow path space 19, the gas having the same temperature as the gas made to flow in the flow path space next to the power generating area GA (to be more specific, the fuel flow path 13 or the air flow path 14).

Such a solid oxide fuel cell is configured to supply the fuel electrode 9 (fuel flow path 13) with a fuel gas such as hydrogen or hydrocarbon, and on the other hand to supply the air electrode 11 (air flow path 14) with an oxidant gas such as air or oxygen, thereby generating electricity. A stacked body in which the metal supports 1 and the separators 2 described above are stacked in multiple layers is the solid oxide fuel cell with a stack structure.

Figure 3:
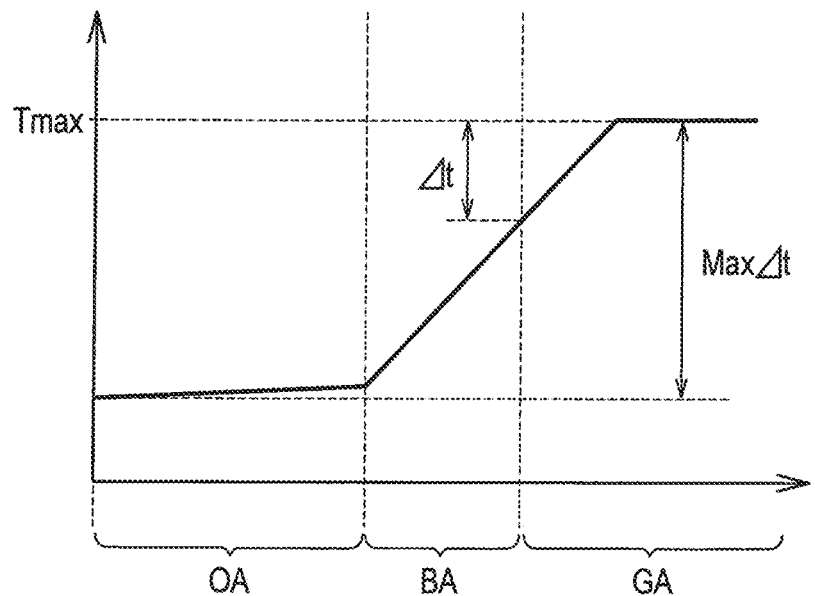
FIG. 3 is a graph illustrating a temperature distribution at rapid startup.
Figure 4:
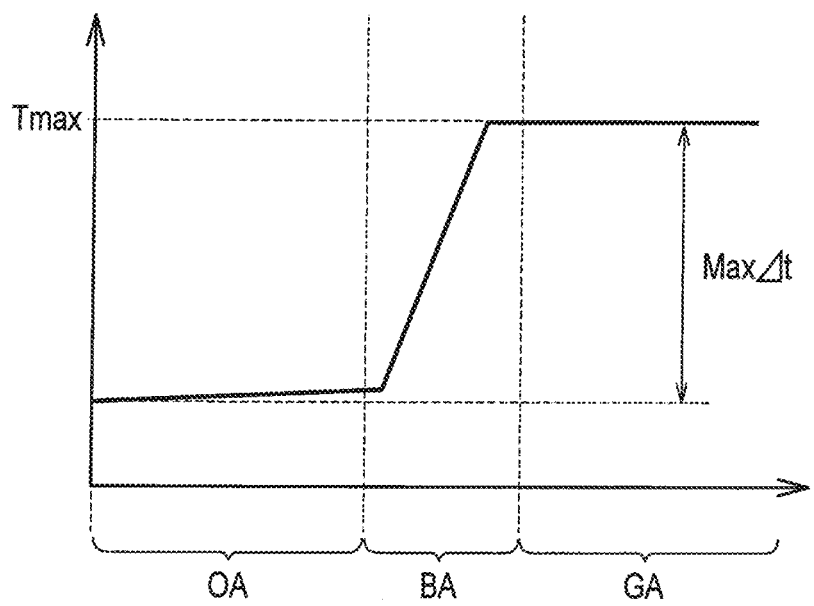
FIG. 4 is a graph illustrating a temperature distribution at rapid startup.

With reference to FIG. 3 and FIG. 4, results for a temperature distribution simulation conducted in order to demonstrate the effects of the solid oxide fuel cell according to the embodiment are described.

[Method]

The temperature distribution simulation for the metal support was conducted by use of a computer based on various types of data such as the shape of the metal support, physical property values of the formation material, the temperature of high-temperature gas flowing in the fuel cell, and the temperature outside the fuel cell.

[Condition]

The temperature distribution of the metal support 70 seconds after the rapid startup was simulated under the rapid startup condition (heating condition) of 10.78° C./s.

In the simulation of Example 1, a high-temperature gas was not made to flow in the flow path space next to the buffer area, and in the simulation of Example 2, high-temperature gas was made to flow in the flow path space next to the buffer area.

[Result]

In Example 1 and Example 2, the highest temperature Tmax of the metal support was 900° C., and the maximum temperature difference MaxΔt was 690° C.

The result of Example 1 (FIG. 3) shows that the temperature gradient in the power generating area is smaller compared to the case where the buffer area is not provided, and the temperature difference Δt at the end portion of the power generation cell is smaller compared to the case where the buffer area is not provided. In addition, the result of Example 2 (FIG. 4) shows that the temperature gradient in the power generating area is zero and the temperature difference Δt at the end portion of the power generation cell is zero.

Hereinafter, the operations and effects of the embodiment are described.

(1) The solid oxide fuel cell according to the embodiment includes the metal support 1 which is formed from a porous metal substrate and which supports the power generation cell 8. The metal support 1 includes the power generating area GA in which the power generation cell 8 is disposed, and the buffer area BA which is formed on the outer side of the power generating area GA in the in-plane direction. The pores in the metal support 1 in the buffer area BA are filled with a material with a thermal conductivity lower than that of the formation material of the metal support 1.

If the thermal conductivity of the buffer area BA is lower than the thermal conductivity of the power generating area GA, it is possible to make small the temperature gradient of the end portion of the power generating area GA because at rapid startup heat does not easily conduct from the power generating area GA to the outer side. This decreases the temperature difference Δt at the end portion of the power generation cell 8 facing the power generating area GA, reducing the thermal stress to be generated in the end portion of the power generation cell 8. Thus, it is possible to suppress generation of an excessively large thermal stress at rapid startup and to suppress breakage of the power generation cell 8.

(2) The metal support 1 in the buffer area BA is formed into a dense layer which does not allow permeation of gas in the thickness direction.

Such a configuration makes it possible to prevent mutual leakage of gas between the fuel flow path 13 and the air flow path 14 opposite to each other with the buffer area BA in between.

(3) A gas is allowed to flow in the flow path space 19 next to the buffer area BA, the gas having the same temperature as the gas made to flow in the flow path space next to the power generating area GA (fuel flow path 13 or air flow path 14).

Since the temperature of the flow path space 19 next to the buffer area BA and the temperature of the flow path space next to the power generating area GA (fuel flow path 13 or air flow path 14) are the same, the temperature of the end portion of the power generating area GA and the temperature of the central portion thereof are the same. This even decreases the temperature difference Δt at the end portion of the power generation cell 8 facing the power generating area GA, further reducing the thermal stress to be generated in the end portion of the power generation cell 8.

Second Embodiment

Figure 5:
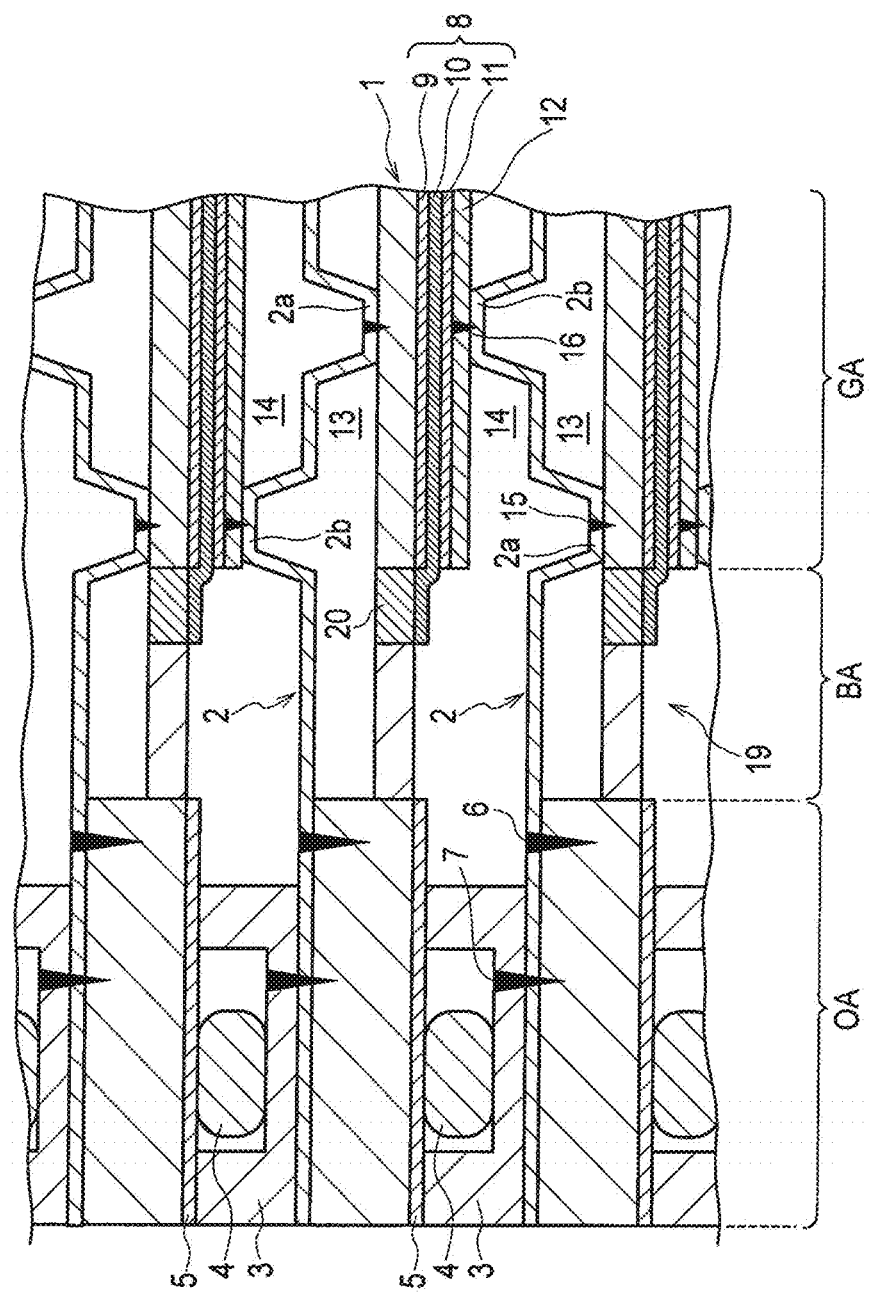
FIG. 5 is a partial cross-sectional view of a fuel cell according to a second embodiment of the present invention.

A solid oxide fuel cell according to a second embodiment of the present invention is described based on FIG. 5. Note that the constituents identical to those of the first embodiment described above are given the same reference signs, and the explanation for those constituents is omitted.

As illustrated in FIG. 5, the solid oxide fuel cell according to the second embodiment is configured such that the pore diameter of the metal support 1 in a boundary neighborhood portion 20 of the buffer area BA adjacent to the power generating area GA is smaller than the pore diameter of the metal support 1 in the power generating area GA. In addition, the edge seal structure is formed in the electrolyte 10 of the power generation cell 8 by extending the end portion of the electrolyte 10 to the above-described boundary neighborhood portion 20.

Hereinafter, the operations and effects of the second embodiment are described.

In the solid oxide fuel cell according to the second embodiment, the pore diameter of the metal support 1 in the boundary neighborhood portion 20 of the buffer area BA adjacent to the power generating area GA is smaller than the pore diameter of the metal support 1 in the power generating area GA.

Such a configuration makes it possible to prevent the filler material filling the pores in the metal support 1 in the buffer area BA from flowing into the pores in the metal support 1 in the power generating area GA because the density in the boundary neighborhood portion 20 is high after sintering.

The foregoing description of the embodiments has provided the details of the present invention. However, the present invention is not limited to the above description. It is obvious to those skilled in the art that various modifications and improvements can be made to the present invention.

REFERENCE SIGNS LIST

1 metal support
2 separator
8 power generation cell
19 flow path space next to buffer area
boundary neighborhood portion
OA outer peripheral area
GA power generating area
BA buffer area

The invention claimed is:

1. A solid oxide fuel cell comprising:
a metal support which is formed from a porous metal substrate and which supports a power generation cell, wherein
the metal support includes a power generating area in which the power generation cell is disposed, a buffer area which is formed on an outer side of the power generating area in an in-plane direction, and an outer peripheral area which is formed on an outer side of the buffer area in the in-plane direction, the metal support is located on the anode side of the power generation cell, a separator is located on the anode side of the power generation cell such that a void region is formed between the separator and the buffer area of the metal support,
the power generation cell is formed as a stacked body of an anode electrode, a solid oxide electrolyte, and a cathode electrode, and
a pore in the metal support in the buffer area is filled with a filler material with a thermal conductivity lower than that of a formation material of the metal support.

2. The solid oxide fuel cell according to claim 1, wherein the metal support in the buffer area is formed into a dense layer which does not allow permeation of gas in a thickness direction.

3. The solid oxide fuel cell according to claim 2, wherein a gas is made to flow in a flow path space next to the buffer area, the gas having the same temperature as a gas made to flow in a flow path space next to the power generating area.

4. The solid oxide fuel cell according to claim 1, wherein a pore diameter of the metal support in a boundary neighborhood portion of the buffer area adjacent to the power generating area is smaller than a pore diameter of the metal support in the power generating area.

5. The solid oxide fuel cell according to claim 1, wherein the buffer area is a non-power generating area.

6. The solid oxide fuel cell according to claim 1, wherein the material in the pore in the metal support in the buffer area comprises a ceramic material.

7. The solid oxide fuel cell according to claim 1, wherein the filler material comprises yttria-stabilized zirconia (YSZ).

8. The solid oxide fuel cell according to claim 1, wherein the filler material comprises lanthanum strontium magnesium gallate (LSGM).

9. The solid oxide fuel cell according to claim 1, wherein the filler material comprises samarium-doped ceria (SDC).

10. The solid oxide fuel cell according to claim 1, wherein the filler material comprises gadolinium-doped ceria (GDC).

11. The solid oxide fuel cell according to claim 1, wherein the filler material comprises scandium-stabilized zirconia (SSZ).

12. The solid oxide fuel cell according to claim 1, wherein a thickness of the power generating area and a thickness of the buffer area are smaller than a thickness of the outer peripheral area.

13. The solid oxide fuel cell according to claim 1, wherein
a thermal conductivity of the buffer area is lower than a thermal conductivity of the power generating area, and
the thermal conductivity of the buffer area is lower than a thermal conductivity of the outer peripheral area.

14. The solid oxide fuel cell according to claim 1, wherein
a thermal capacity of the buffer area is larger than a thermal capacity of the power generating area, and
the thermal capacity of the buffer area is larger than a thermal capacity of the outer peripheral area.

15. The solid oxide fuel cell according to claim 1, further comprising
a pair of separators that sandwich the metal support therebetween; and
a pair of seal frames that sandwich a portion of the pair of separators and a portion of the metal support therebetween.

16. The solid oxide fuel cell according to claim 15, wherein the outer peripheral area of the metal support is the portion of the metal support sandwiched by the pair of seal frames.

* * * * *